(12) United States Patent
Derelöv

(10) Patent No.: US 12,331,769 B2
(45) Date of Patent: Jun. 17, 2025

(54) SET OF PANELS WITH A MECHANICAL LOCKING DEVICE

(71) Applicant: Välinge Innovation AB, Viken (SE)

(72) Inventor: Peter Derelöv, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 874 days.

(21) Appl. No.: 16/856,765

(22) Filed: Apr. 23, 2020

(65) Prior Publication Data

US 2020/0340513 A1    Oct. 29, 2020

(30) Foreign Application Priority Data

Apr. 26, 2019   (EP) ..................................... 19171372

(51) Int. Cl.
*F16B 12/24*     (2006.01)
*A47B 47/04*     (2006.01)
(Continued)

(52) U.S. Cl.
CPC ............ *F16B 12/24* (2013.01); *A47B 47/042* (2013.01); *F16B 12/14* (2013.01); *F16B 12/26* (2013.01); *F16B 2012/145* (2013.01)

(58) Field of Classification Search
CPC .......... F16B 12/14; F16B 12/24; F16B 12/26; F16B 2012/145; A47B 47/042
See application file for complete search history.

(56) References Cited

U.S. PATENT DOCUMENTS 3,949,534 A * 4/1976 Croy .................. F16B 12/24
                                                 297/440.13
4,171,150 A * 10/1979 Soderlund .............. A47B 96/00
                                                   312/265.5
(Continued)

FOREIGN PATENT DOCUMENTS

CN       108 343 659 A       7/2018
DE       298 07 724 U1       4/1999
(Continued)

OTHER PUBLICATIONS https://www.finepowertools.com/woodworking/wood-joint-types/ (hereto as Appendix "A").*
(Continued)

*Primary Examiner* — Matthew R McMahon
(74) *Attorney, Agent, or Firm* — Boone IP Law

(57) ABSTRACT

A set of panels including a first panel with a first main plane and a second panel with a second main plane, wherein the first main plane is essentially perpendicular to the second main plane and a junction plane is extending between the first main plane and the second main plane, wherein the first and the second panel includes a mechanical locking device which is configured for locking a first junction plane surface of the first panel to a second junction plane surface of the second panel at the junction plane, wherein the mechanical locking device includes a rod-shaped element at the first or second junction plane surface configured to cooperate with a cylindrical shaped element groove at the opposite junction plane surface for locking the first and the second panel in a first direction which is perpendicular to the first main plane.

18 Claims, 8 Drawing Sheets

(51) Int. Cl.
  *F16B 12/14* (2006.01)
  *F16B 12/26* (2006.01)

(56) References Cited

U.S. PATENT DOCUMENTS

| | | | | |
|---|---|---|---|---|
| 5,603,586 | A | * | 2/1997 | Wetsel ............... F16B 12/26 403/353 |
| 6,045,290 | A | * | 4/2000 | Nocievski ............ F16B 12/46 403/231 |
| 8,651,593 | B2 | * | 2/2014 | Bezich ................ B65D 5/68 312/259 |
| 8,887,468 | B2 | | 11/2014 | Håkansson et al. |
| 9,375,085 | B2 | | 6/2016 | Derelöv |
| 9,458,634 | B2 | * | 10/2016 | Derelov ............ E04F 15/02038 |
| 9,538,842 | B2 | | 1/2017 | Håkansson et al. |
| 9,598,856 | B2 | * | 3/2017 | Schulte ................ F16B 5/07 |
| 9,655,442 | B2 | | 5/2017 | Boo et al. |
| 9,714,672 | B2 | | 7/2017 | Derelöv et al. |
| 9,714,673 | B2 | * | 7/2017 | Phillips .............. F16B 12/26 |
| 9,723,923 | B2 | | 8/2017 | Derelöv |
| 9,726,210 | B2 | | 8/2017 | Derelöv et al. |
| 9,945,121 | B2 | | 4/2018 | Derelöv |
| 10,034,541 | B2 | | 7/2018 | Boo et al. |
| 10,202,996 | B2 | | 2/2019 | Håkansson et al. |
| 10,415,613 | B2 | | 9/2019 | Boo |
| 10,448,739 | B2 | | 10/2019 | Derelöv et al. |
| 10,451,097 | B2 | | 10/2019 | Brännström et al. |
| 10,486,245 | B2 | | 11/2019 | Fridlund |
| 10,506,875 | B2 | | 12/2019 | Boo et al. |
| 10,544,818 | B2 | | 1/2020 | Fridlund |
| 10,548,397 | B2 | | 2/2020 | Derelöv et al. |
| 10,669,716 | B2 | | 6/2020 | Derelöv |
| 10,670,064 | B2 | | 6/2020 | Derelöv |
| 10,724,564 | B2 | | 7/2020 | Derelöv |
| 10,731,688 | B2 | | 8/2020 | Brännström et al. |
| 10,736,416 | B2 | | 8/2020 | Derelöv et al. |
| 10,830,266 | B2 | | 11/2020 | Fridlund |
| 10,830,268 | B2 | | 11/2020 | Boo |
| 10,871,179 | B2 | | 12/2020 | Håkansson et al. |
| 10,876,562 | B2 | | 12/2020 | Pervan |
| 10,876,563 | B2 | | 12/2020 | Derelöv et al. |
| 10,968,936 | B2 | | 4/2021 | Boo et al. |
| 11,076,691 | B2 | | 8/2021 | Boo |
| 11,083,287 | B2 | | 8/2021 | Boo et al. |
| 11,085,474 | B2 | * | 8/2021 | Davis .................. F16B 12/22 |
| 11,098,484 | B2 | | 8/2021 | Derelöv |
| 11,137,007 | B2 | | 10/2021 | Fridlund |
| 11,204,051 | B2 | | 12/2021 | Brännström et al. |
| 11,246,415 | B2 | | 2/2022 | Derelöv et al. |
| 11,272,783 | B2 | | 3/2022 | Derelöv |
| 2006/0250052 | A1 | * | 11/2006 | Davis .................. F16B 12/26 312/107 |
| 2010/0253195 | A1 | * | 10/2010 | Owens ................ F16B 12/125 312/351.2 |
| 2012/0279161 | A1 | | 11/2012 | Håkansson et al. |
| 2013/0048632 | A1 | * | 2/2013 | Chen ................... B65D 9/24 220/4.33 |
| 2013/0071172 | A1 | * | 3/2013 | Maertens ............ F16B 5/0016 403/376 |
| 2015/0035422 | A1 | | 2/2015 | Håkansson et al. |
| 2015/0078807 | A1 | | 3/2015 | Brännström et al. |
| 2015/0078819 | A1 | | 3/2015 | Derelöv et al. |
| 2015/0196118 | A1 | | 7/2015 | Derelöv |
| 2015/0198191 | A1 | | 7/2015 | Boo |
| 2016/0007751 | A1 | | 1/2016 | Derelöv |
| 2016/0174704 | A1 | | 6/2016 | Boo et al. |
| 2016/0270531 | A1 | | 9/2016 | Derelöv |
| 2017/0079433 | A1 | | 3/2017 | Derelöv et al. |
| 2017/0089379 | A1 | | 3/2017 | Pervan |
| 2017/0097033 | A1 | | 4/2017 | Håkansson et al. |
| 2017/0159291 | A1 | | 6/2017 | Derelöv |
| 2017/0208938 | A1 | | 7/2017 | Derelöv et al. |
| 2017/0227031 | A1 | | 8/2017 | Boo |
| 2017/0227032 | A1 | | 8/2017 | Fridlund |
| 2017/0227035 | A1 | | 8/2017 | Fridlund |
| 2017/0234346 | A1 | | 8/2017 | Fridlund |
| 2017/0298973 | A1 | | 10/2017 | Derelöv |
| 2017/0360193 | A1 | | 12/2017 | Boo et al. |
| 2018/0080488 | A1 | | 3/2018 | Derelöv |
| 2018/0087552 | A1 | | 3/2018 | Derelöv et al. |
| 2018/0112695 | A1 | | 4/2018 | Boo et al. |
| 2018/0119717 | A1 | | 5/2018 | Derelöv |
| 2018/0202160 | A1 | | 7/2018 | Derelöv |
| 2018/0328396 | A1 | | 11/2018 | Fransson et al. |
| 2019/0113061 | A1 | | 4/2019 | Håkansson et al. |
| 2019/0166989 | A1 | | 6/2019 | Boo et al. |
| 2019/0191870 | A1 | | 6/2019 | Derelöv |
| 2019/0195256 | A1 | | 6/2019 | Derelöv |
| 2019/0289999 | A1 | | 9/2019 | Derelöv et al. |
| 2019/0320793 | A1 | | 10/2019 | Boo |
| 2019/0323532 | A1 | | 10/2019 | Boo |
| 2019/0323533 | A1 | | 10/2019 | Boo |
| 2019/0323534 | A1 | | 10/2019 | Derelöv |
| 2019/0323535 | A1 | | 10/2019 | Derelöv |
| 2020/0003242 | A1 | | 1/2020 | Brännström et al. |
| 2020/0055126 | A1 | | 2/2020 | Fridlund |
| 2020/0069048 | A1 | | 3/2020 | Derelöv et al. |
| 2020/0069049 | A1 | | 3/2020 | Derelöv et al. |
| 2020/0102978 | A1 | | 4/2020 | Fridlund |
| 2020/0121076 | A1 | | 4/2020 | Derelöv et al. |
| 2020/0214447 | A1 | | 7/2020 | Derelöv et al. |
| 2020/0300284 | A1 | | 9/2020 | Pervan |
| 2020/0337455 | A1 | | 10/2020 | Boo et al. |
| 2021/0079650 | A1 | | 3/2021 | Derelöv |
| 2021/0148392 | A1 | | 5/2021 | Brännström et al. |
| 2021/0180630 | A1 | | 6/2021 | Bruno et al. |
| 2021/0190112 | A1 | | 6/2021 | Derelöv |
| 2021/0207635 | A1 | | 7/2021 | Håkansson et al. |
| 2021/0222716 | A1 | | 7/2021 | Derelöv et al. |
| 2021/0262507 | A1 | | 8/2021 | Svensson et al. |
| 2021/0262508 | A1 | | 8/2021 | Svensson et al. |
| 2021/0276108 | A1 | | 9/2021 | Derelöv et al. |
| 2021/0285480 | A1 | | 9/2021 | Derelöv et al. |
| 2021/0381251 | A1 | | 12/2021 | Svensson |
| 2022/0018373 | A1 | | 1/2022 | Boo |
| 2022/0049735 | A1 | | 2/2022 | Meijer |

FOREIGN PATENT DOCUMENTS

| | | | | |
|---|---|---|---|---|
| DE | 19827597 A1 | * | 12/1999 | .......... A47B 47/042 |
| DE | 10 2011 009 334 A1 | | 8/2011 | |
| WO | WO 2017/131574 A1 | | 8/2017 | |

OTHER PUBLICATIONS

U.S. Appl. No. 16/386,732, Christian Boo, filed Apr. 17, 2019 (Cited herein as US Patent Application Publication No. 2019/0323532 A1 of Oct. 24, 2019).

U.S. Appl. No. 16/386,810, Christian Boo, filed Apr. 17, 2019 (Cited herein as US Patent Application Publication No. 2019/0323533 A1 of Oct. 24, 2019).

U.S. Appl. No. 16/386,824, Christian Boo, filed Apr. 17, 2019 (Cited herein as US Patent Application Publication No. 2019/0320793 A1 of Oct. 24, 2019).

U.S. Appl. No. 16/553,325, Peter Derelöv and Johan Svensson, filed Aug. 28, 2019 (Cited herein as US Patent Application Publication No. 2020/0069048 A1 of Mar. 5, 2019).

U.S. Appl. No. 16/553,350, Peter Derelöv and Johan Svensson, filed Aug. 28, 2019 (Cited herein as US Patent Application Publication No. 2020/0069049 A1 of Mar. 5, 2020).

U.S. Appl. No. 17/154,344, Peter Derelöv and Johan Svensson, filed Jan. 21, 2021.

U.S. Appl. No. 17/173,823, Peter Derelöv and Johan Svensson, filed Feb. 11, 2021.

U.S. Appl. No. 17/185,428, Johan Svensson and Peter Derelöv, filed Feb. 25, 2021.

U.S. Appl. No. 17/185,403, Johan Svensson and Peter Derelöv, filed Feb. 25, 2021.

U.S. Appl. No. 17/154,344, Derelöo et al.

U.S. Appl. No. 17/173,823, Derelöv et al.

U.S. Appl. No. 17/185,428, Svensson et al.

(56) References Cited

OTHER PUBLICATIONS

U.S. Appl. No. 17/185,403, Svensson et al.
International Search Report/Written Opinion mailed May 15, 2020 in PCT/EP2020/061349, ISA European Patent Office, Rijswijk, NL, 9 pages.
Extended European Search Report mailed Sep. 26, 2019 in EP 19171372.6, European Patent Office, Munich, DE, 7 pages.
Derelöv, Peter, et al., U.S. Appl. No. 17/154,344 entitled "Set of Panels with a Mechanical Locking Device," filed in the U.S. Patent and Trademark Office Jan. 21, 2021.
Derelöv, Peter, et al., U.S. Appl. No. 17/173,823 entitled "Machine," filed in the U.S. Patent and Trademark Office Feb. 11, 2021.
Svensson, Johan, et al., U.S. Appl. No. 17/185,428 entitled "Set of Panels with a Mechanical Locking Device," filed in the U.S. Patent and Trademark Office Feb. 25, 2021.
Svensson, Johan, et al., U.S. Appl. No. 17/185,403 entitled "Set of Panels with a Mechanical Locking Device," filed in the U.S. Patent and Trademark Office Feb. 25, 2021.
U.S. Appl. No. 17/370,521, Christian Boo, filed Jul. 8, 2021.
Boo, Christian, U.S. Appl. No. 17/370,521 entitled "Mechanical Locking System for Panels," filed in the U.S. Patent and Trademark Office Jul. 8, 2021.
U.S. Appl. No. 17/588,733, Peter Derelöv and Johan Svensson, filed Jan. 31, 2022.
U.S. Appl. No. 17/674,262, Johan Svensson and Peter Derelöv, filed Feb. 17, 2022.
Derelöv, Peter, et al., U.S. Appl. No. 17/588,733 entitled "Arrangements for Preparing of Furniture Product," filed in the U.S. Patent and Trademark Office Jan. 31, 2022.
Svensson, Johan, et al., U.S. Appl. No. 17/674,262 entitled "Mechanical Connection Arrangement for Panels," filed in the U.S. Patent and Trademark Office Feb. 17, 2022.
European Search Report and Search Opinion received for European Application No. 24157886.3, mailed on May 22, 2024, 8 pages.
Intention to grant received for European Patent Application No. 20719478, mailed on Sep. 13, 2023, 7 pages.
International Preliminary Report on Patentability received for PCT Patent Application No. PCT/EP2020/061349, mailed on Nov. 4, 2021, 8 pages.
U.S. Appl. No. 18/983,417, Thomas Meijer, filed Dec. 17, 2024.
U.S. Appl. No. 17/709,994, Johan Svensson, filed Mar. 31, 2022.
U.S. Appl. No. 17/710,055, Johan Svensson, filed Mar. 31, 2022.
U.S. Appl. No. 17/886,517, Peter Derelöv, filed Aug. 12, 2022.
U.S. Appl. No. 18/191,444, Johan Svensson, filed Mar. 28, 2023.
U.S. Appl. No. 18/312,808, Johan Svensson, filed May 5, 2023.
U.S. Appl. No. 18/383,242, Peter Derelöv, filed Oct. 24, 2023.
U.S. Appl. No. 18/764,217, Thomas Meijer, filed Jul. 4, 2024.
U.S. Appl. No. 18/729,224, Johan Svensson, filed Jul. 16, 2024.

* cited by examiner

SET OF PANELS WITH A MECHANICAL LOCKING DEVICE

CROSS REFERENCE TO RELATED APPLICATIONS

The present application claims the benefit of European Application No. 19171372.6, filed on Apr. 26, 2019. The entire contents of European Application No. 19171372.6 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

BACKGROUND

A furniture product provided with a mechanical locking device is known in the art, as evidenced by WO2017/131574. The furniture comprises a first panel connected mainly perpendicular to a second panel by a miter joint which includes a mechanical locking device.

SUMMARY

It is an object of certain aspects of the present invention to provide an improvement over the above described techniques and known art; particularly to facilitate assembling of panels configured to be assembled without the need of using any tools. A further object of at least certain aspects of the present invention is to facilitate assembling of panels configured to be assembled with a locking device that is easy to manufacture and to use, which reduces the risk of incorrect installation thereof. The panels may be assembled and locked together to obtain a furniture component or a furniture, such as a bookshelf, a cupboard, a wardrobe, a kitchen fixture, a drawer, or a box for storing or transportation.

At least some of these and other objects and advantages that will be apparent from the description have been achieved by set of panels comprising a first panel with a first main plane and a second panel with a second main plane The first main plane is essentially perpendicular to the second main plane in a locked position of the first and the second panel and a junction plane is extending between the first main plane and the second main plane. The junction plane is in the locked position extending from an inner corner to an outer corner of the first and the second panel. The first and the second panel comprises a mechanical locking device which is configured for locking a first junction plane surface of the first panel to a second junction plane surface of the second panel at the junction plane. The mechanical locking device comprises a rod-shaped element at the first or second junction plane surface configured to cooperate with an element groove, such as a cylindrical-shaped element groove, at the opposite junction plane surface for locking the first and the second panel in a first direction which is perpendicular to the first main plane. The first or second junction plane surface comprises at least one locking groove, such as an essentially cylindrical locking groove, and at the opposite junction plane surface at least one essentially cylindrical locking part configured to be inserted into the locking groove. The locking part comprises a locking surface configured to cooperate with a locking surface of the locking groove to lock the first and the second panel in a second direction. The cylindrical locking part is configured to be displaceable in an axial direction of the cylindrical locking part during the locking.

This configuration provides a mechanical locking device which may be easy to manufacture with a simple production equipment. Essentially round grooves and rod-shaped elements may be relatively easy to manufacture with high tolerances.

According to an aspect the locking part may be flexible.

According to an aspect the locking part may comprise a spring.

The locking part may be positioned at the first junction plane surface or at the second junction plane surface and the locking groove may be positioned at the opposite second junction plane surface or first junction plane surface.

According to an aspect the locking part may be configured to be fixed in a locking part groove. The locking part may be configured to be fixed with friction. The locking part may have one or more protruding parts, acting as friction nobs. The protruding parts may be configured to prevent rotation during the insertion of the locking part into the locking part groove. The locking part groove may be of an essentially cylindrical shape.

According to an aspect the locking part may have a recess which may facilitate positioning of the locking part in a desired angle when the locking part is inserted in the locking part groove. The recess may be at the center of the locking part body. The recess may be configured to cooperate with an insertion device, for inserting the locking part into the locking part groove. The locking part recess may be shaped as a circle, slot, triangle, square, star or a combination thereof. The locking part recess may extrude in the length direction of the locking part. The locking part recess may extrude all through the locking part.

The rod-shaped element may be positioned at the first junction plane surface or at the second junction plane surface and the element groove may be positioned at the opposite second junction plane surface or first junction plane surface.

The rod-shaped element and the locking part may be positioned at opposite sides of the first and second junction plane surface of the first and the second panel.

The angle between the junction plane and the first main plane may be about 45°. A different angle may be preferred for a set with different thicknesses of the first and the second panel. The angle may be adapted such that the junction plane extends through an intersection of an outer face of the first panel and an outer face of the second panel to an intersection of an inner face of the first panel and an inner face of the second panel. The inner face of the first panel may be facing the inner face of the second panel. An outer face of the first panel may be opposite to the inner face of the first panel. An outer face of the second panel may be opposite to the inner face of the second panel.

An outer corner at the junction plane of the first and the second panel may comprise a beveled edge, preferably covered by a decorative layer. The bevel may increase the strength of the corner. The decorative layer may be a plastic foil, veneer or paint.

According to an aspect the locking surface may be a part of a bottom surface of the locking groove.

According to an aspect the locking groove may be a drill hole, which may be an essentially cylindrical locking groove According to an aspect the locking surface may be the bottom surface of a drill hole.

According to an aspect the locking surface may be a part of a funnel shaped bottom of the locking groove. The funnel-shaped bottom may have an angle of about 90°, or about 70° to about 110°, or within the range of about 40° to about 140°.

According to an aspect the rod-shaped element may be arranged in an element groove, such as a cylindrical-shaped element groove, at a junction plane surface.

According an aspect the rod-shaped element may be configured to be glued in the element groove.

According an aspect the element groove may be of an essentially cylindrical shape.

According an aspect the element groove may be a drill hole.

According an aspect the rod-shaped element may be configured to be fixed in the element groove by friction.

According an aspect the rod-shaped element may be a wooden dowel.

According an aspect the rod-shaped element may comprise of one or more material, such as wood, metal or polymer material or a mix thereof. The polymer material may comprise an enforcement material, such as glass fiber, carbon fiber or a metal.

According to an aspect the number of rod-shaped elements may be equal or greater than the number of locking parts used in the mechanical locking device.

According to an aspect the locking part may comprises polymer material. The polymer material may comprise an enforcement, such as glass fiber, carbon fiber or a metal.

According to an aspect the locking part may comprise an elastic part. The elastic part may be configured to provide a force, in the axial direction of 1 N/mm to 50 N/mm, such as 10 N/mm to 30 N/mm. The elastic part may comprise a polymer-based material such as thermoplastic and/or a metal.

According to an aspect the rod-shaped element may be of an essentially cylindrical shape.

According to an aspect the locking part may be arranged in a locking part groove. The locking part, in an unflexed/non-compressed state, may be configured to be positioned partly in the locking groove.

According to an aspect the locking part, in a flexed/compressed state, may be configured to be substantially positioned within the locking part groove.

According to an aspect the locking part groove may be of an essentially cylindrical shape.

According to an aspect the locking part groove may be a drill hole.

According to an aspect the locking part have an elongated shape, where a length is greater than a width.

According to an aspect the locking part during assembly of the first and the second panel may be configured to flex in the depth direction of the locking part groove.

According to an aspect the first and/or the second panel may comprise a wood fiber based material, such as one or more of HDF, MDF, plywood, solid wood or particleboard, or a reinforced plastic board or a wood fiber composite board. The core may also be a plastic core comprising thermosetting plastic or thermoplastic, e.g., vinyl, PVC, PU or PET. The plastic core may comprise fillers.

According to an aspect the first and/or second panel may comprise a decorative layer, such as a foil or a veneer, on one or more surfaces.

According to an aspect the first junction plane surface and/or the second junction plane surface may comprise an edge groove, to minimize the risk of gap between the first and the second panel at the inner and/or the outer corner 61,62 in the locked position of the first 10 and the second panel 20. The edge groove may extend along essentially the entire length of the first and/or the second panel. The edge groove may be absent at the junction plane surface close to the front edge of the panel.

According to an aspect the first junction plane surface or the second junction plane surface may comprise a dis-mantling groove configured to receive a dis-mantling element. The dis-mantling groove facilitate a dis-mantling element to be inserted and push back the locking part in an un-locked position. This enables dis-assembly of the set of panels.

According an aspect of the invention the first and/or the second panel may comprise a back-panel groove, configured to receive a back panel. The back-panel groove may extend along essentially the entire length of first and/or the second panel. The back-panel groove may be bottom ended.

At least some of the above identified and other objects and advantages that may be apparent from the description have been achieved by a locking device for a furniture product in accordance with the above.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DETAILED DESCRIPTION

Figure 1:
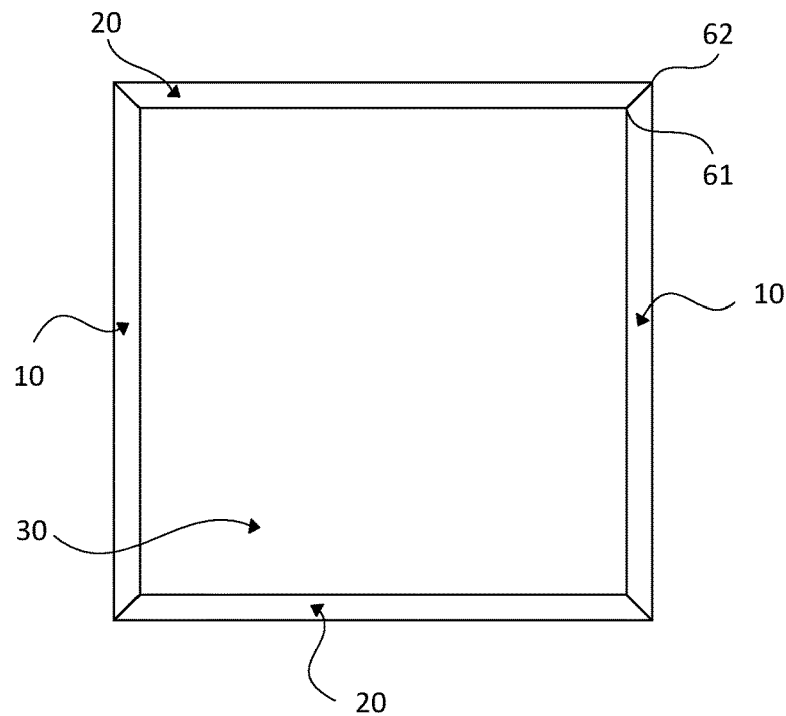
FIG. 1 shows a view of a set comprising two of the first panel, two of the second panel and one back panel in an assembled state of an embodiment of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
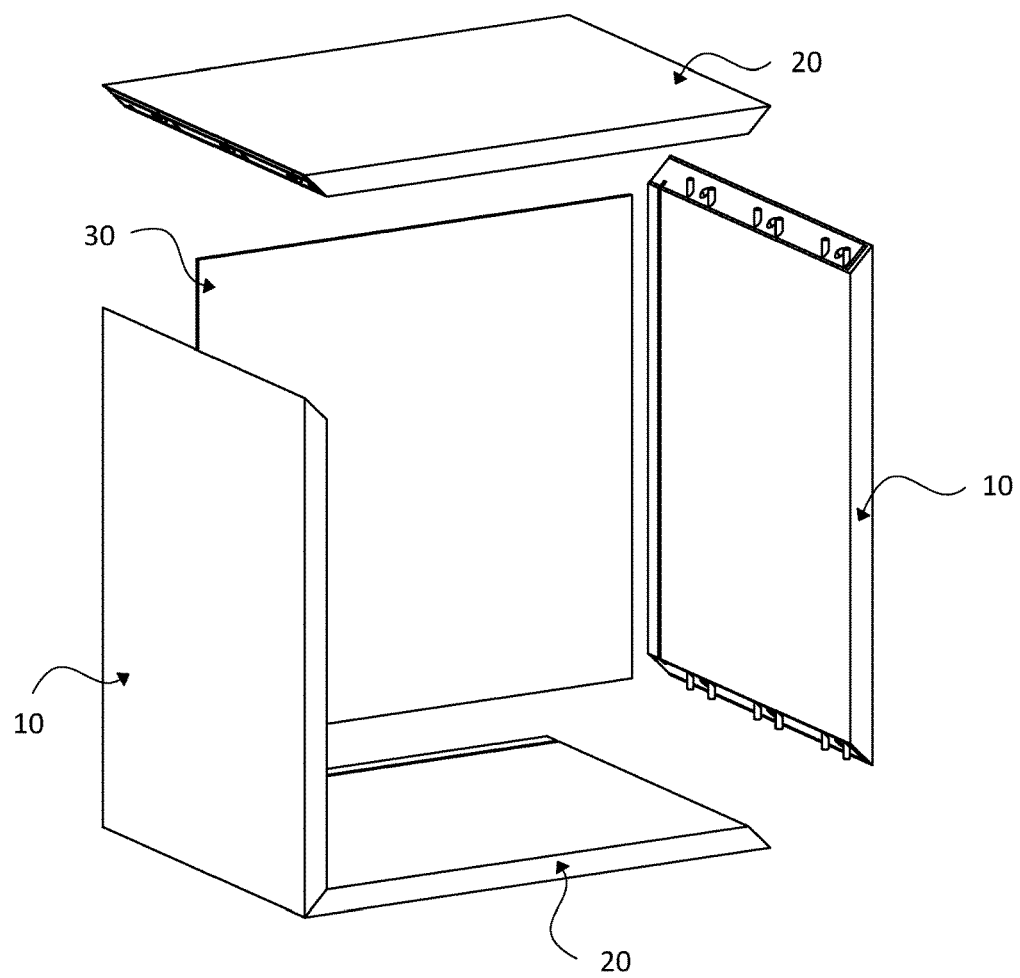
FIG. 2 shows a 3D view of a set comprising two of the first panel, two of the second panel and one back panel in a partly assembled state of an embodiment of the invention.

An embodiment of the invention is shown in FIG. 1 in front view and in FIG. 2 in a 3D-view including a set of panels comprising a first panel 10 with a first main plane 11 and a second panel 20 with a second main plane 21, wherein the first main plane 11 is essentially perpendicular to the second main plane 21 and a junction plane J is extending between the first main plane 11 and the second main plane 21, wherein the first and the second panel comprises a mechanical locking device which is configured for locking a first junction plane surface 13 of the first panel 10 to a second junction plane surface 23 of the second panel 20 at the junction plane J, wherein the mechanical locking device may comprise a rod-shaped element 12 at the first or second junction plane surface 13, 23 configured to cooperate with an element groove 17, 22, such as a cylindrical shaped element groove, at the opposite junction plane surface 13,23 for locking the first and the second panel in a first direction D1 which may be perpendicular to the first main plane 11.

According an embodiment of the invention the first or second junction plane surface 13,23 may comprise at least one locking groove 15, such as an essentially cylindrical locking groove, and at the opposite junction plane surface 13,23 at least one locking part 50, such as a cylindrical-shaped locking part, configured to be inserted into the locking groove 15. Said locking part 50 may comprise a locking surface 55 configured to cooperate with a locking surface 16 of the locking groove 15 to lock the first and the second panel in a second direction D2.

According an aspect of the invention the angle between the junction plane J and the first main plane 11 may be about 45°.

According an aspect of the invention the element groove 17, 22 and/or the locking part grove 25 and/or the locking groove 15 may be reinforced by plastic, e.g., thermoplastic and/or liquid, e.g., PVAc-glue.

According an aspect of the invention the set of panels may be a part of a furniture or a furniture component, such as a bookshelf, a cupboard, a wardrobe, a box, a drawer or a furniture component.

Figure 3:
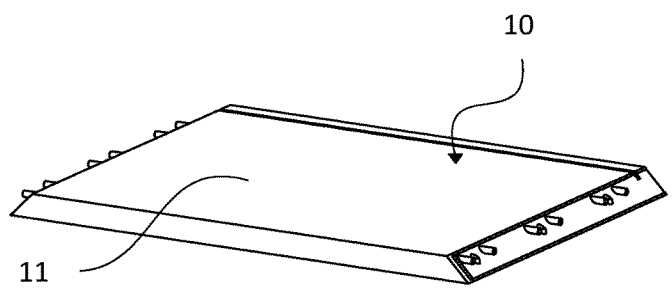
FIG. 3 shows an embodiment of the first panel in 3D view from above.
Figure 4:
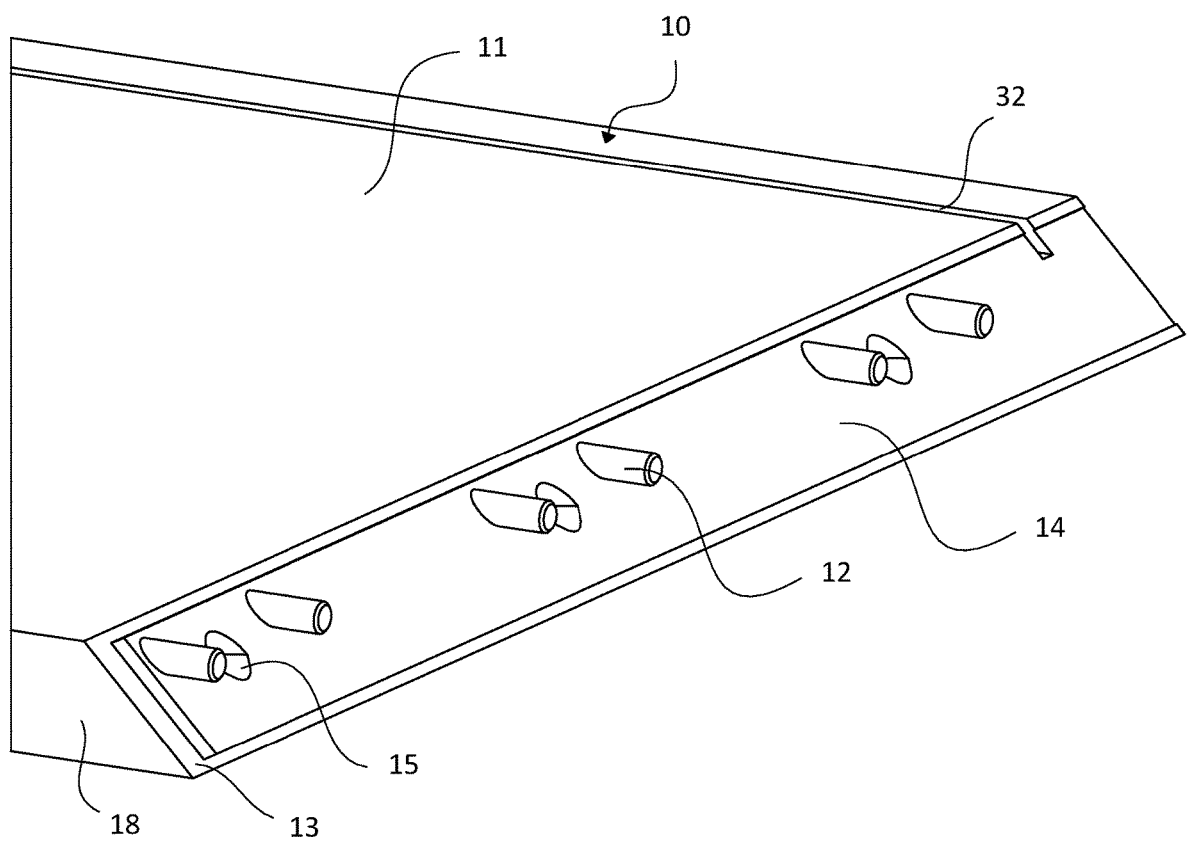
FIG. 4 shows an enlargement of a part of the panel shown in FIG. 3.

FIGS. 3,4 disclose a first panel 10 according an embodiment of the invention. The first panel 10 may have a back-panel groove 32, configured to cooperate with a back panel 30. The first panel 10 may have at least one element groove 17, at a junction plane surface 13, configured to cooperate with a rod-shaped element 12. The orientation of the center axis of element groove may be mainly parallel to the first main plain 11. The first panel 10 may have at least one locking groove 15, comprising a locking surface 16. The locking groove 15 may be funnel-shaped. The angle α of the funnel-shape may be of about 90°, or about 70° to about 110°, or within the range of about 40° to about 140°. The orientation of the center axis of the funnel-shaped locking groove 15 may be mainly perpendicular to the first main plain 11.

Figure 5:
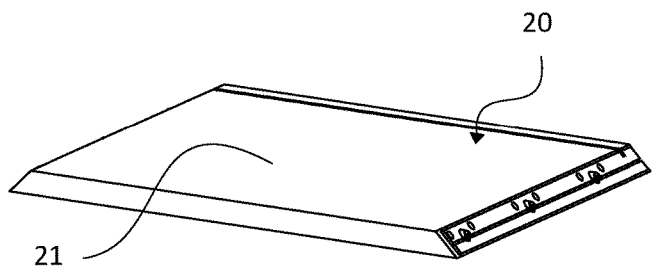
FIG. 5 shows an embodiment of the second panel in 3D view from above.
Figure 6:
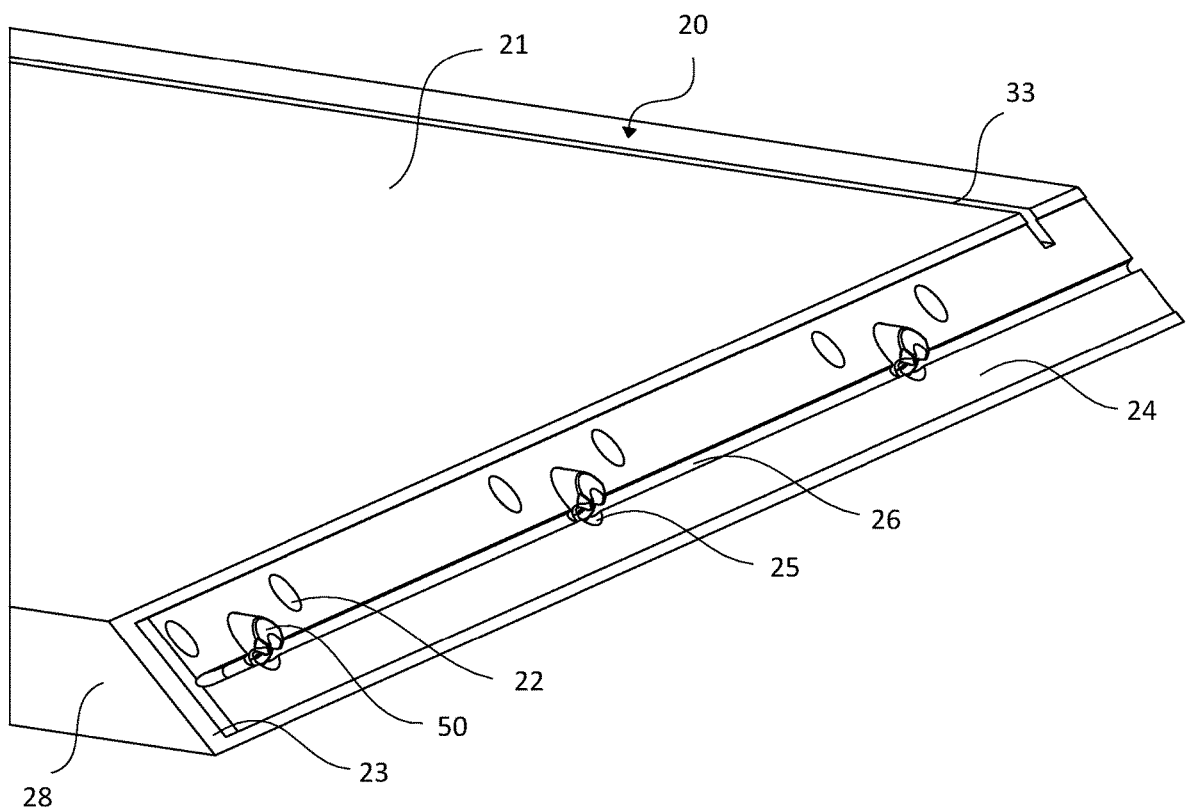
FIG. 6 shows an enlargement of a part of the panel shown in FIG. 5.

FIGS. 5-6 disclose a second panel 20 according an embodiment of the invention. The second panel 20 may have a back-panel groove 33, configured to cooperate with a back panel 30. The second panel 20 may have at least one element groove 22, at a junction plane surface 23, configured to cooperate with a rod-shaped element 12. The orientation of the center axis of the element groove 22 may be mainly perpendicular to the second main plain 21. The second panel 20 may have at least one locking part groove 25, configured to cooperate with a locking part 50. The orientation of the center axis of the locking part groove 25 may be mainly parallel to the second main plain 21.

Figure 7:
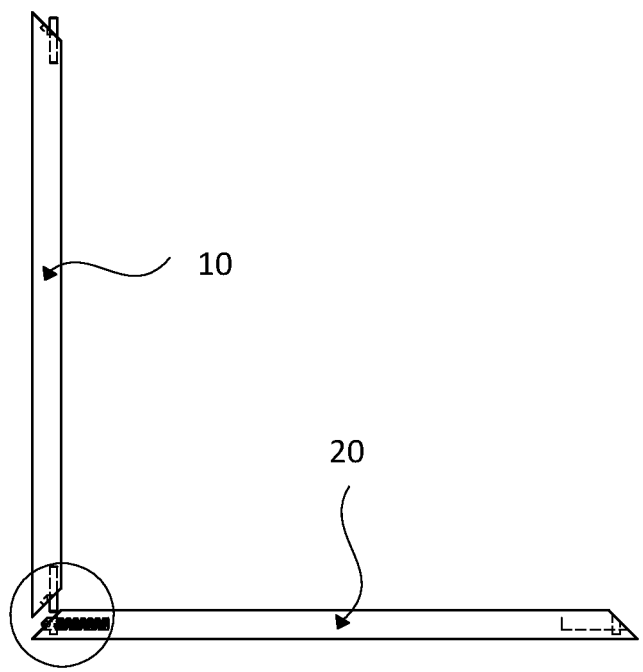
FIG. 7 shows a side view of a set in an unassembled state of an embodiment of the invention.
Figure 8:
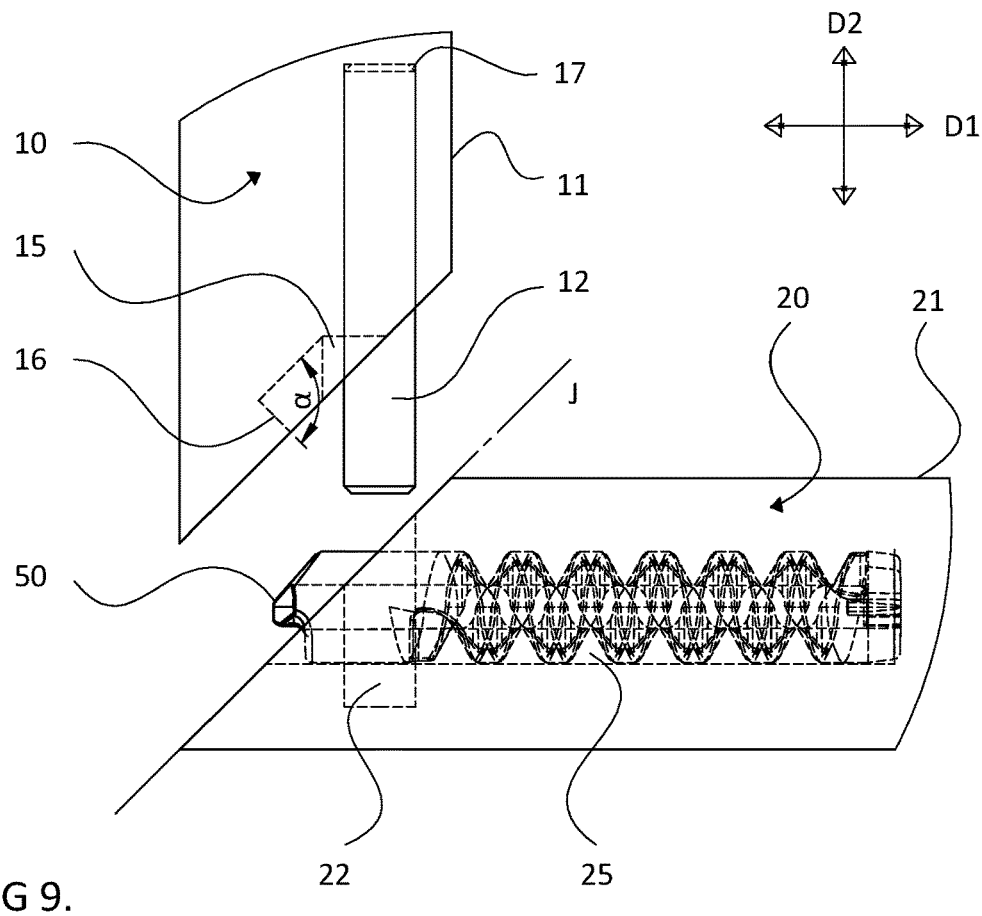
FIG. 8 shows an enlargement of a corner part of an embodiment of the first and the second panel before assembling.

FIGS. 7-8 disclose a set according an embodiment in an unassembled state.

Figure 9:
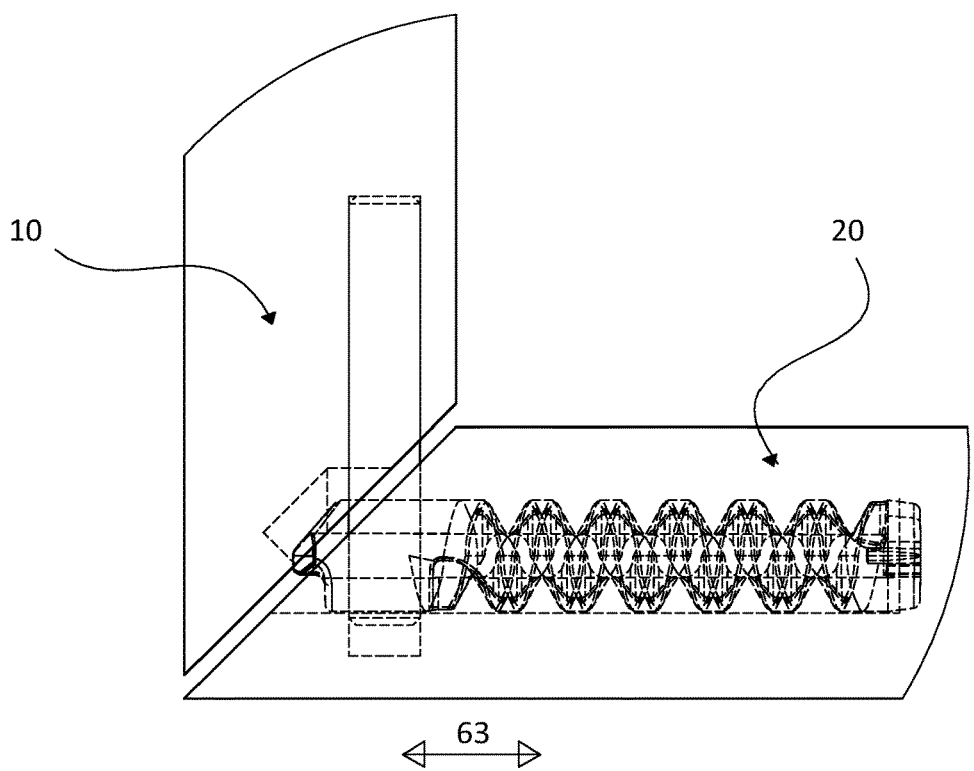
FIG. 9 shows an enlargement of a corner part of an embodiment of the first and the second panel during assembling.

FIG. 9 disclose a set according an embodiment during assembly. The set may be assembled by displacing the first panel 10 relative the second panel 20 in a direction which may be essentially perpendicular to the second main plain 21. The mechanical locking device may be configured to automatically lock the first panel 10 to the second panel 20 when the rod-shaped element 12 is inserted into the element groove 22, the locking part 50 is inserted into the locking groove 15 and locks against the locking surface 16, and the first junction plane surface 13 is arranged against the second junction plane surface 23 at the junction plane J. The cylindrical locking part 50 is configured to be displaceable in an axial direction 63 of the cylindrical locking part during assembling of the first panel 10 and the second panel 20.

FIGS. 10, 13-16 disclose a set according an embodiment in an assembled and locked position.

Figure 10:
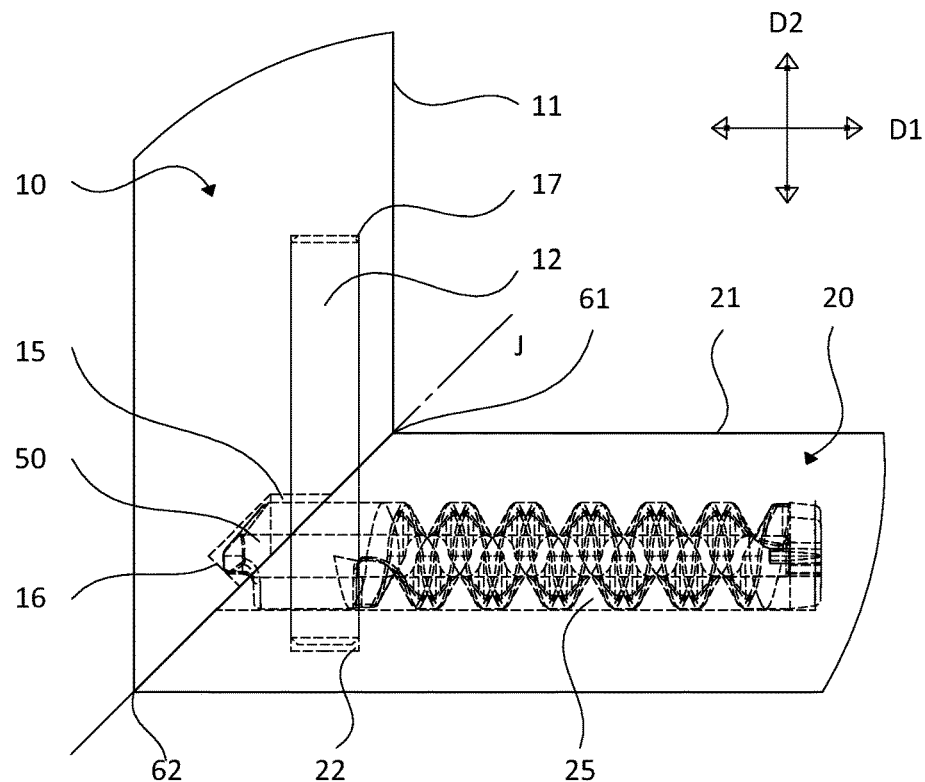
FIG. 10 shows an enlargement of a corner part of an embodiment of the first and the second panel in assembled state.

FIG. 10 shows that the first main plane 11 may be essentially perpendicular to the second main plane 21 in a locked position of the first and the second panel. The junction plane J is extending between the first main plane 11 and the second main plane 21, The junction plane J is in the locked position extending from an inner corner 61 to an outer corner 62 of the first 10 and the second panel 20.

The locking part 50 may be positioned at the first junction plane surface 13 or at the second junction plane surface 23 and the locking groove 15 may be positioned at the opposite second junction plane 23 surface or first junction plane surface 13.

The rod-shaped element 12 may be positioned at the first junction plane surface 13 or at the second junction plane surface 23 and the element groove 22 may be positioned at the opposite second junction plane surface 23 or first junction plane surface 13.

The rod-shaped element 12 and the locking part 50 may be positioned at opposite sides of the first and second junction plane surface 13,23 of the first and the second panel 10,20.

According an embodiment of the invention the rod-shaped element 12 may be a wooden dowel.

According an embodiment of the invention the rod-shaped element 12 may be of an essentially cylindrical shape.

Figure 11:
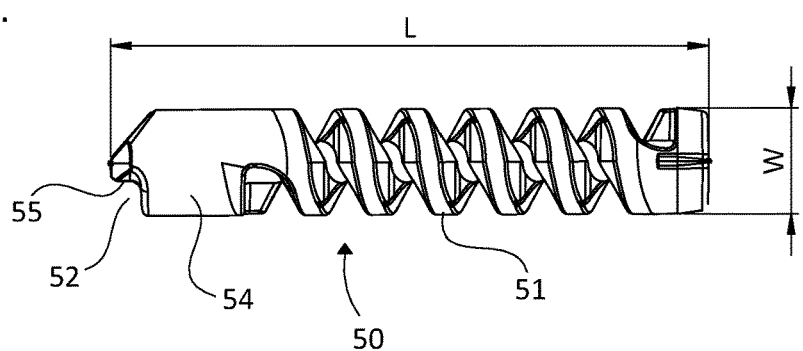
FIG. 11 shows a side view of the locking part according to an embodiment of the invention.
Figure 12A:
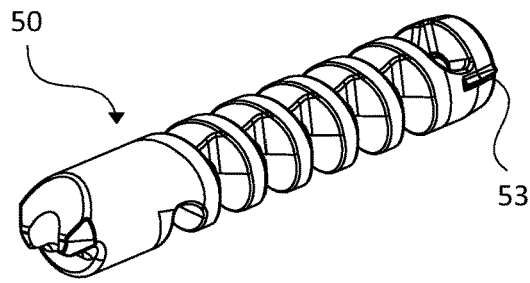
FIG. 12A shows a 3D view of the locking part according to an embodiment of the invention.
Figure 12B:
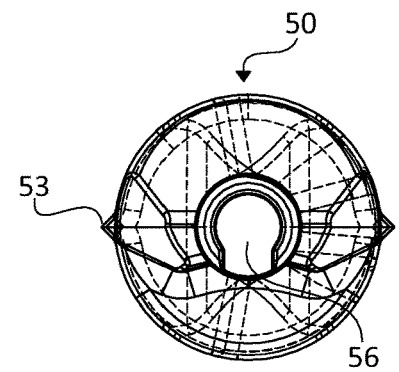
FIG. 12B shows a front view of the locking part according to an embodiment of the invention.
Figure 13:
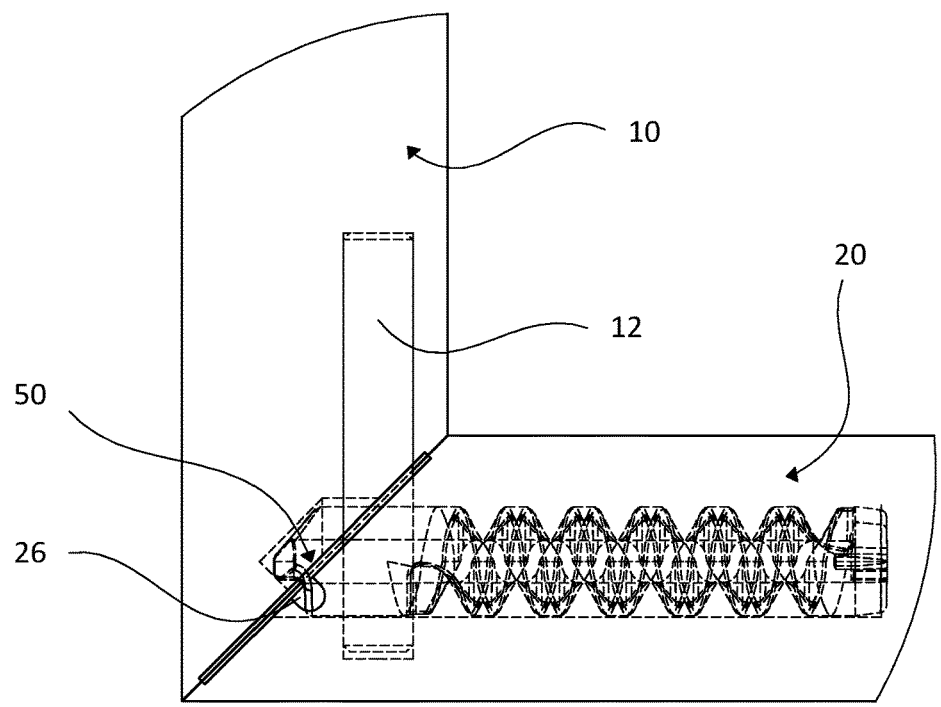
FIG. 13 shows an enlargement of a corner part of the first and the second panel in assembled state of an embodiment of the invention.
Figure 14:
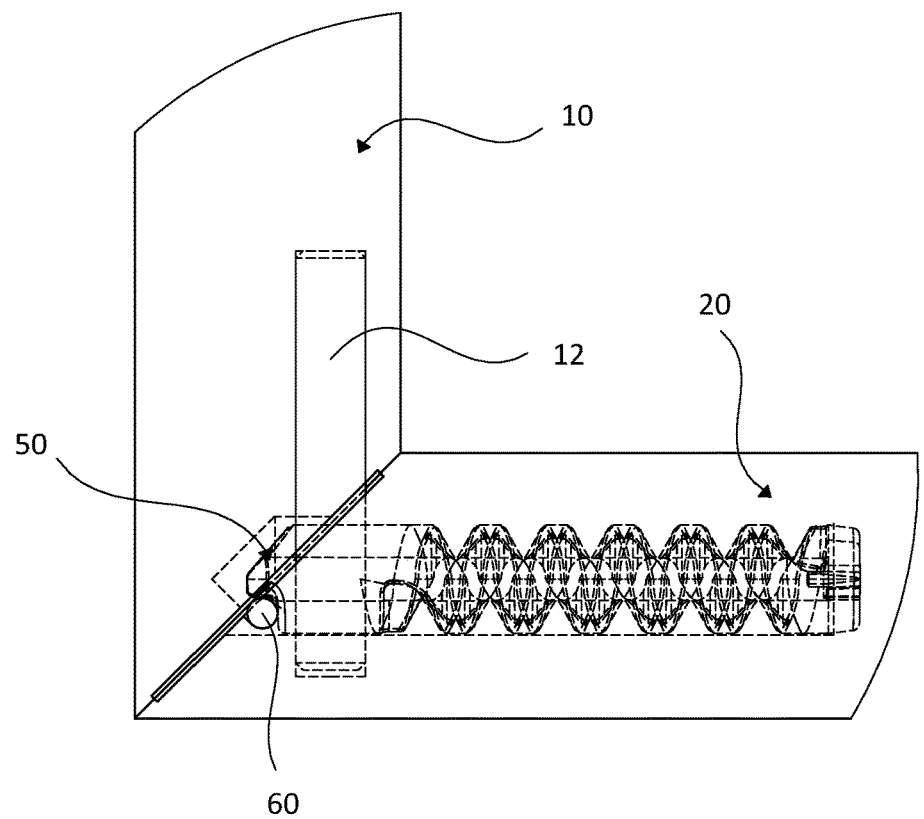
FIG. 14 shows an enlargement of a corner part of the first and the second panel and a dis-mantling element in an un-locked state of an embodiment of the invention.
Figure 15:
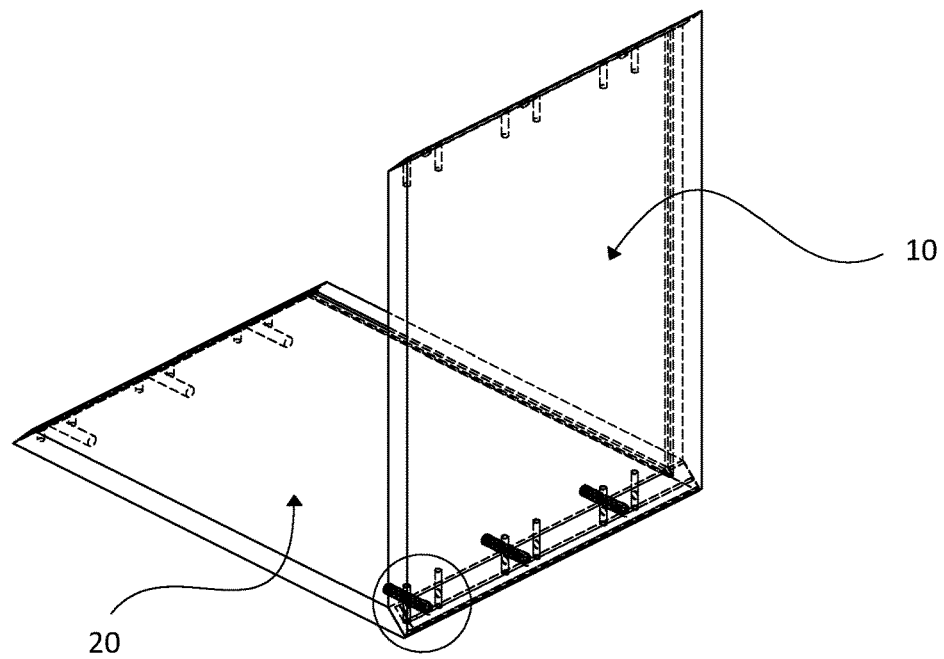
FIG. 15 shows a 3D view of a set in an assembled state of an embodiment of the invention.
Figure 16:
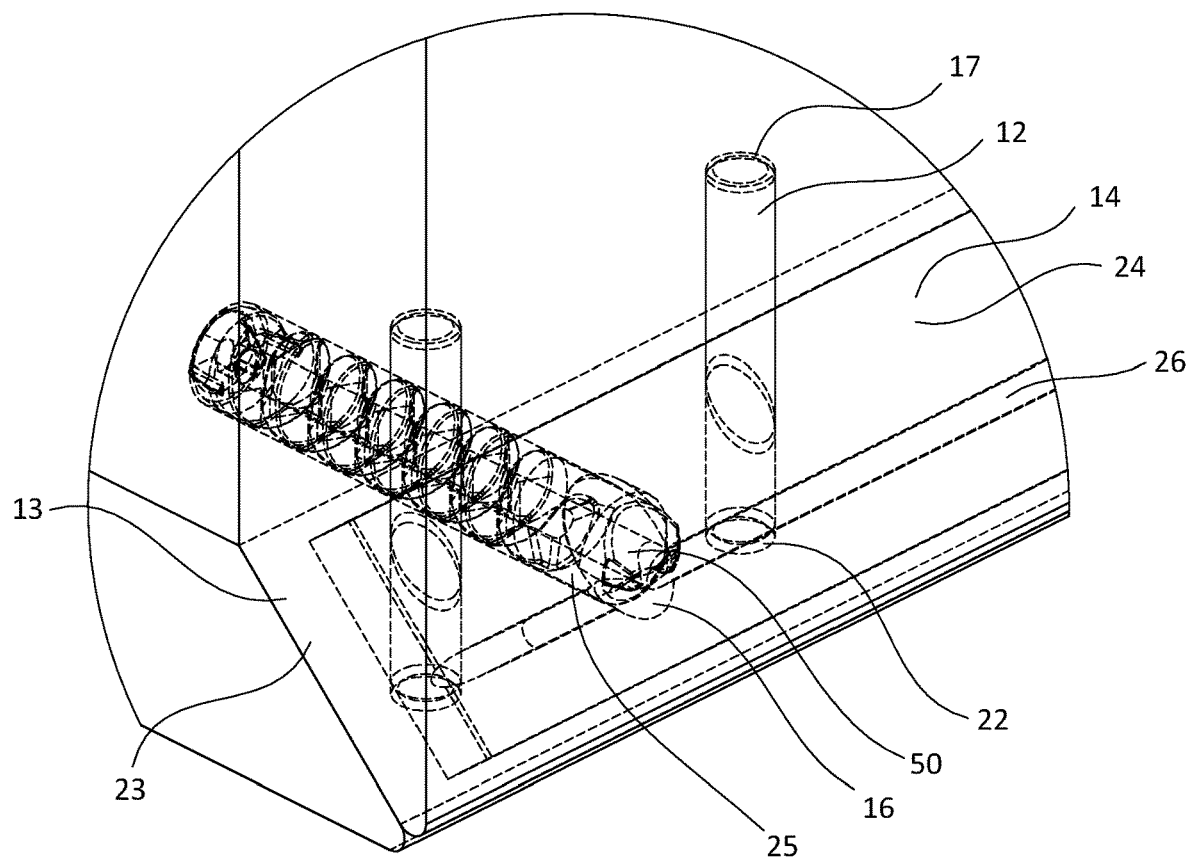
FIG. 16 shows an enlargement of a corner part shown in FIG. 15.

FIGS. 11,12A,12B disclose a locking part 50 according an embodiment of the invention. The locking part 50 may comprise a flexible part 51, the flexible part 51 may be a spiral-shaped spring.

The locking part and/or the flexible part 51 may comprise a polymer-based material such as thermoplastic and/or a metal. The locking part and/or the flexible part 51 may be injection molded.

The polymer material may be PA (nylon), POM, PC, PP, PET or PE.

The locking part may provide a force, in the axial direction of 1 N/mm to 50 N/mm, such as 10 N/mm to 30 N/mm. The locking part 50 may have a recess 52. The recess 52 enables the locking groove 15 to be placed at a greater distance from the outer corner of the junction plain. The locking part 50 may have a partly solid body 54 which may prevent tilting, in a radial direction, during displacement in the locking part groove 25. The locking part 50 may have one or more protruding parts 53, acting as friction knobs to fix the locking part 50 by friction in the locking part groove 25. The protruding part 53 may be placed at the bottom end of the locking part 50. The protruding part 53 may be configured to prevent rotation during the insertion of the locking part into the locking part groove 25.

According an embodiment the locking part 50 may have a recess 56 to facilitate positioning of locking part 50 in a desired angle when the locking part 50 is inserted in the locking part groove 25. The locking part recess 56 may be at the center of the locking part body 54. The locking part recess 56 may be configured to cooperate with an insertion device, for inserting the locking part 50 into the locking part groove 25. The locking part recess 56 may be shaped as a part of a circle, slot, triangle, square, star or a combination thereof. The locking part recess 56 may extend in the length direction of the locking part 50, such as the length of the locking part body 54, or the length of the entire locking body.

According to an embodiment of the invention the locking part 50 may comprise a locking surface 55 configured to cooperate with a locking groove 15 and/or a locking surface 16. The locking surface 55 of the locking part 55 may be essentially parallel with the first or the second main plane 11, 21 of the first and the second panel 10,20, respectively, which comprises the locking part groove 25.

According to an embodiment the locking part 50 may be configured to flex in the depth direction of the locking part groove 25. The locking part 50 may have an elongated shape, where the length L may be greater than the width W.

According to an embodiment the locking part 50 may be of an essentially cylindrical shape.

According to an embodiment the locking part 50 may comprise polymer material, preferably with an enforcement, such as glass fiber, carbon fiber or a metal.

FIG. 13-16 disclose a set according an embodiment wherein the first 13 and/or the second junction plane surface 23 may comprise an edge groove 14,24 to minimize the risk of a gap between the first 10 and the second panel 20 at the inner and/or the outer corner 61,62 in the locked position of the first 10 and the second panel 20. The edge groove 14,24 may extend along essentially the entire length of the first 10 and/or the second panel 20. The edge groove 14,24 may be absent at the junction plane surface 13,23 close to the front edge of the panel 18,28.

In an embodiment of the innovation the first 13 and/or the second junction plane surface 23 may comprise a dis-mantling groove 26 configured to receive a dis-mantling element 60. The dis-mantling element 60 may be an elongated tool, with an insertion part as shown in FIG. 2. The insertion part may be essentially cylindrical shaped. The set may be dis-assembled by inserting the dis-mantling element 60 into the dis-mantling groove 26, the dis-mantling element 60 displaces, such as axially displaces, the locking part 50 to an un-locked position.

According an embodiment of the invention the core of the first panel 10 and/or of the second panel 20 may be a wood-based core, such as MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel 10 and/or the second panel 20 may also be of solid wood.

The first panel 10 and/or the second panel 20 may be provided with a decorative layer, such as a foil or a veneer, on one or more surfaces.

According an embodiment of the invention an outer corner at the junction plane J of the first panel 10 and/or the second panel 20 may comprise a beveled edge, preferably covered by a decorative layer. The bevel may increase the strength of the corner. The decorative layer may be a plastic foil, veneer or paint.

The invention claimed is:

1. A set of panels comprising a first panel with a first main plane and a second panel with a second main plane,
   wherein the first main plane is essentially perpendicular to the second main plane in a locked position of the first and the second panel and a junction plane is extending between the first main plane and the second main plane,
   wherein the junction plane is in the locked position extending from an inner corner to an outer corner of the first and the second panel,
   wherein the first and the second panel comprise a mechanical locking device which is configured for locking a first junction plane surface of the first panel to a second junction plane surface of the second panel at the junction plane,
   wherein the first junction plane surface and the second junction plane surface extend along the junction plane,
   wherein the mechanical locking device comprises a rod-shaped element at one of the first or second panel intersecting the junction plane and configured to cooperate with an element groove at the other one of the first or second panel for locking the first and the second panel in a first direction which is perpendicular to the first main plane,
   wherein:
   the one of the first or second panel comprises a locking groove and the other one of the first or second panel comprises a locking part configured to be inserted into the locking groove, wherein the locking groove is a fully blind hole with a bottom surface facing an opening of the locking groove,
   the locking part comprises a locking surface configured to cooperate with a locking surface of the locking groove to lock the first and the second panel in a second direction,
   the locking part is of a cylindrical shape, and
   the cylindrical locking part is configured to be displaceable in an axial direction of the cylindrical locking part during a locking of the first panel to the second panel,
   wherein the rod-shaped element protrudes from and intersects the first or second panel at a first surface of the first or second panel, and the locking groove is recessed from and extends to the first surface of the first or second panel.

2. The set of panels as claimed in claim 1, wherein the locking part is flexible.

3. The set of panels as claimed in claim 1, wherein the angle between the junction plane and the first main plane is about 45°.

4. The set of panels as claimed in claim 1, wherein the locking surface of the locking groove is a part of the bottom surface of the locking groove.

5. The set of panels as claimed in claim 1, wherein the locking surface of the locking groove is a part of a funnel shaped bottom of the locking groove.

6. The set of panels as claimed in claim 1, wherein the mechanical locking device comprises a number of rod-shaped elements and a number of locking parts, wherein the number of rod-shaped elements is equal or greater than the number of locking parts.

7. The set of panels as claimed in claim 1, wherein the locking part comprises polymer material.

8. The set at claimed in claim 1, wherein the locking part comprises an elastic part.

9. The set as claimed in claim 1, wherein the rod-shaped element is of an essentially cylindrical shape.

10. The set as claimed in claim 1, wherein the locking part is arranged in a locking part groove.

11. The set of panels as claimed in claim 10, wherein the locking part has an elongated shape, where a length is greater than a width.

12. The set of panels as claimed in claim 10, wherein the locking part during assembly of the first and the second panel is configured to flex in the depth direction of the locking part groove.

13. The set of panels as claimed in claim 1, wherein the first and/or the second panel comprises a wood fiber based material.

14. The set of panels as claimed in claim 13, wherein the first or second panel comprises a decorative layer.

15. The set of panels as claimed in claim 1, wherein the first junction plane surface and/or the second junction plane surface comprises an edge groove which is configured to minimize the risk of a gap between the first and the second panel at the inner and/or the outer corner in the locked position of the first and the second panel.

16. The set of panels as claimed in claim 15, wherein the edge groove is recessed to the first surface of the first or second panel.

17. The set of panels as claimed in claim 1, wherein the locking part protrudes from and intersects the other one of the first or second panel at a second surface of the other one of the first or second panel, and the element groove is recessed from and extends to the second surface of the other one of the first or second panel.

18. The set of panels as claimed in claim 1, wherein the locking groove is not a through hole.

* * * * *